United States Patent Office 3,383,337
Patented May 14, 1968

3,383,337
METHOD OF TREATING A PLASTISOL COMPOSITION CONTAINING AN EPOXY RESIN ADHESIVE
Richard A. Garling, Kent, and Walter R. Hausch and Charles W. Thomas, Akron, Ohio, assignors to The Firestone Tire & Rubber Company, Akron, Ohio, a corporation of Ohio
No Drawing. Filed Aug. 2, 1962, Ser. No. 214,214
2 Claims. (Cl. 260—2.5)

This invention relates to a plastisol which includes an adhesive (a resin) distributed throughout it. The invention includes the plastisols and their use.

The adhesive

The adhesive is an epoxy resin, a phenolic resin or other heat-curable or thermosetting adhesive resin such as dicyclopentadiene which is soluble or dispersible in the plasticizer of the plastisol at a lower temperature, and when the plastisol is heated to solubilize the vinyl polymer or other plastisol resin in the plasticizer, the adhesive is heat-cured and as it is cured it becomes less soluble in the plasticized plastisol resin and is spewed to its surface and remains as a separate phase.

The amount of adhesive used must be in excess of that which is compatible with the plasticized plastisol resin at the temperature necessary to cure the adhesive as well as to cause solution of the plastisol resin in the plasticizer. The adhesive which spews to the surface forms an adhesive covering which may be utilized for bonding the plasticized plastisol resin to metal, glass, thermoset plastics, wood, nylon, and, in general, anything to which the resin will adhere. Thus, if the plastisol is applied between two flat sheets the adhesive is spewed ot the surface of these sheets and adheres the sheets to the plasticized vinyl polymer or other resin; and if glass or plastic reflective beads are mixed with the plastisol, the adhesive is spewed to the surface of the beads and adheres them to the plasticized vinyl polymer or other resin. Thus, the adhesive is spewed to either an external or internal surface of the plastisol resin.

The plastisol resins and plasticizers employed are those usually employed in plastisols. Epoxy or phenolic or other heat-curable adhesive is included in the plastisol of this invention, the adhesive being incorporated in the plastisol as a liquid, in solution or in finely divided form.

The plastisol resin

The plastisol resin is preferably at least 90 percent vinyl chloride, and may contain several percent of one or more comonomers such as vinyl acetate, etc. Such vinyl polymers are well known in the plastisol art. Other resins capable of forming plastisols and fusing when heated, may be used. The term "plastisol" is used herein to include organosols, which are a type of plastisol which contains a volatile solvent for the plasticizer of the plastisol.

The plasticizer

Any of the plasticizers usually found in plastisols can be employed. These plasticizers may be esters or epoxidized esters, etc., the latter containing up to, for example, 7 percent of epoxy equivalent weight. The epoxidized plasticizers are preferred because of the greater heat stability of the plastisols containing them. This greater stability is desirable in the plastisols of this invention because they may be heated for a longer time than usual in order to cure the adhesive resin.

As the plastisol plasticizer dissolves into the plastisol resin, the amount of plasticizer remaining for dilution of the adhesive decreases. As the dilution is reduced, the speed of cure of the adhesive is increased. The time required for curing the adhesive depends upon the nature of the resin, whether or not an activator of the adhesive is present, and its nature, etc.

The plasticizer controls to some extent the physical properties of the ultimate composition, such as the flexibility of the plasticized resin at both high and low temperatures, its chemical resistance, its solvent resistance, as well as the stability of the plastisol in storage, resistance to the migration or spewing of the adhesive, and the time and temperature necessary to cause solvation of the plastisol resin in the plasticizer.

In the practice of this invention it is necessary to effect a balance between the solvation rate of the plasticizer and resin of the plastisol and the cure of the adhesive. Although flexible products are generally produced according to this invention, it is possible to use plasticizers which produce a relatively rigid product due either to the type or quantity of plasticizer used. For example, a low-melting solid plasticizer such as chlorinated biphenyl (Arochlor) may be used to produce a rigid product. Also, if the plasticizer contains reactive sites for curing, a rigid product is produced.

The adhesive may constitute from 5 (or generally preferably 10) to 55 percent of the total plastisol composition exclusive of fillers, pigments or other inert materials added to alter the physical properties of the plastisol but which are not essential for the adhesive to form. For example, sand or grit may be added to the adhesive plastisol composition in a ratio of 4 parts of sand to 1 part of plastisol to be cured on a suitable surface to make it non-slipping.

When the plastisol is heated, the resin spews to the surface. The separation ordinarily is not complete, and the fused resin includes some heat-cured resin in addition to the plasticized plastisol resin, and the adhesive at the surface includes some of the plasticized plastisol resin.

If the adhesive is cured too fast, the proper separation of the adhesive does not occur. If, on the other hand, the adhesive is cured too slowly, the resin of the plastisol may become overheated, with resulting decomposition. It is therefore impossible to say that any particular curing cycle will be effective with all compositions, each being necessarily adapted to the particular plastisol resin, plasticizer, adhesive and curing agent (if present).

Various additives may be used in the plastisol to alter its physical properties such as the viscosity of the plastisol before heating, its hardness after heating, and to stabilize any of its components, to accelerate the cure of the adhesive, etc.

Epoxy resins as adhesives

The adhesive may be any usual epoxy resin. Those formed from epichlorhydrin and Bisphenol A (p,p-isopropylidene diphenol) are satisfactory, but others may be employed, such as the Oxirons which are aliphatic compounds, more or less unsaturated, with an epoxy group in a terminal or branch position. These products are manufactured by Food Machinery & Chemical Corporation.

If an epoxy resin is used, an activator is usually included to create polar groups (usually hydroxy groups) to give the desired chemical bonding. If the plastisol resin is a polymer or copolymer of vinyl chloride, the activator must be one that does not remove sufficient chlorine to cause objectionable decomposition. Activators such as aliphatic amines, etc. which are too reactive should be avoided, although if they react slowly with the epoxy resin at a lower temperature they may be used if not mixed with the resin until just prior to use. For formation of more rigid adhesive plastisols, polymerized amino acids or condensation products of polyamines with polycarboxylic acids (polyamides) when used as an activator in a plastisol containing an epoxy adhesive, react with the adhesive to produce a product in which the adhesive is rigid.

The usual more stable activators for epoxy resins include such well known compounds as diamino diphenyl sulfone, dicyandiamide, acid anhydrides, malic acid and other hydroxy acids, etc. These are dispersed so as to remain suspended in the plastisol until it is heated to fuse the plastisol resin and plasticizer. Phenolic resins known to be activators can also be used.

The amount of activator employed depends upon the epoxy equivalent of the epoxy resin. At least a stiochiometric amount of activator based on the amount of active hydrogen present in the resin and capable of reacting with the epoxy groups on it is utilized. The amount of activator used may be in excess of the stoichiometric amount in order to overcome the diluting effect of the plasticizer present.

When an epoxy resin is employed in a plastisol of a vinyl polymer with a usual ester plasticizer, the plasticized vinyl polymer and adhesive may tend to separate so that the one can be stripped from the other. However, by employing a nitrile rubber (a butadiene-acrylonitrile copolymer), either liquid or powder as a fluxing agent, such separation and stripping are prevented. Other compounds such as polyesters which are compatible with both the vinyl polymer and the epoxy resin can be used as fluxing agents. If the Oxiron type of epoxy resin is used as the adhesive, its greater compatibility with vinyl polymers makes the use of a fluxing agent unnecessary. Various coarse pigments or fillers such as asbestos or glass fiber, etc. also may be used to form an adhesive bridge between the adhesive and the plasticized vinyl polymer or other plastisol resin.

When a phenolic resin is used, a fluxing agent is not required by may be used.

Phenolic resins as adhesives

The phenolic resins which are used are the usual thermal adhesive type, such as phenol-aldehydes and modifications thereof. They may be partially cured when added to the plastisol. These include, for example, the cresol and resorcinol types, and a catalyst such as hexamethylenetetramine, etc. may be included to facilitate curing the resin. The catalyst may regulate the rate of insolubilization of the adhesive resin to cause separation from the balance of the plastisol at the time and temperature interval desired.

The phenolic resins normally described as two-step thermosetting resins are preferred. Those phenolic resins which only partially cure may be used to effect tackiness. Phenolics modified with epoxy or vinyl and further falling into the classification of two-step setting resins are satisfactory.

Uses

The plastisols of this invention have many uses. When applied to a metal surface, it is usually unnecessary to remove from the surface any small amount of oil that may be present from a prior treatment such as forming, or coating to prevent rusting. The reason is that ordinarily the oil is dissolved into the plasticizer and becomes part of the total plasticizing system before the resin spews to the surface so that before the adhesive spews into contact with the surface the oil has been removed and a firm bond is formed directly with the metal.

The plastisols can be utilized as gap-filling adhesive sealants by including a foaming agent that releases carbon dioxide, nitrogen or other gas, or it may be a solvent or water that volatilizes during heating, or it may be an activator that releases gas on heating. The plastisol may foam merely through expansion of entrapped air. The plastisol may even be frothed and used as a froth. On heating, the plastisol expands and fills the gap to which it is applied, and as the heating progresses the adhesive spews to the surface and forms a permanent bond with the walls of the gap.

Thermoset phenolic bubbles previously set may be included as a filler. These are commonly referred to as microballons or microspheres. These materials serve to reduce plastisol density, making it unnecessary to generate a foam during processing.

An adhesive, such as an epoxy or phenolic resin, that spews to a surface to which nothing is adhered, hardens to give a tough, durable wear-resistant coating. Thus the plastisol can be adapted to a very wide variety of diffferent uses.

EXAMPLES

The following examples are illustrative of the invention:

EXAMPLE 1

| | Parts by weight |
|---|---|
| Exon 666 [1] | 28.4 |
| Exon 654 [1] | 14.2 |
| Admex 710 (epoxidized soybean oil plasticizer) | 26.5 |
| Mark KCB [2] | 0.95 |
| Cab-O-Sil M-2 (silica aerogel) | 2.85 |
| Hycar 1312 (Liquid nitrile rubber) | 7.6 |
| Dicup 40C [3] | 1.75 |
| DER 331 [4] | 17.1 |
| Dicyandiamide [5] | 1.65 |
| | 100.00 |

[1] The Exon resins are vinyl polymers manufactured by The Firestone Tire & Rubber Company. The Exon 666 has a larger particle size, and the Exon 654 is finely powdered and includes an wetting agent which assists in dispersing the resin in the plasticizer.
[2] Mark KCB is a cadimum-barium-zinc heat stabilizer for the vinyl polymer.
[3] Dicup 40C is 40 percent dicumyl peroxide and 60 percent calcium carbonate. It is used to partially cure the Hycar.
[4] DER 331 is a liquid epoxy resin manufactured by Dow Chemical Company. It can be replaced by any condensation product of eipchlorhydrin and Bisphenol A. The epoxy equivalent of the DER 331 is 185 to 195. The viscosity at 77° F. is 11,000 to 13,500 centipoise.
[5] The dicyandiamide is pulverized and is used as an activator for the epoxy resin.

The foregoing formulation is cured at 350° F. for a period of 30 to 60 minutes. It is suitable as a "flutter cement" for bonding oily sheet metal to a reinforcing metal frame in an automobile, and has other uses.

EXAMPLE 2

A plastisol is prepared from the following:

| | Parts by weight |
|---|---|
| Exon 654 | 36 |
| Admex 710 | 18 |
| Di-2-ethylhexyl phthalate | 18 |
| Mark M [1] | 1 |
| DER 331 [2] | 1 |
| Hycar 1312 (liquid nitrile rubber) | 5 |
| Catalin 8941 [3] | 21 |

[1] Barium-cadmium stabilizer.
[2] Liquid epoxy resin used as a stabilizer.
[3] Cashew nut liquid modified novolak with approximately 9% hexamethylenetetramine. Used as an adhesive.

The foregoing basic plastisol is adapted for various uses.

EXAMPLE 2A

It can be formulated as a low-density adhesive, as follows:

| | Parts by weight |
|---|---|
| Plastisol of Example 2 | 100 |
| BJO 0930 [1] | 20 |
| EM 207 polyester plasticizer | 8 |

[1] Phenolic Microballoons averaging 0.0017" in diameter, with a bulk density of 3 to 5 lbs. per cu. ft.

This adhesive can be used in various places where light weight and bulk are desirable, as in metal fabrications where sound-deadening is desired, as in the roof of an automobile. When heated to 350° F. for 30 minutes to effect a cure, the adhesive spews to the surface of the microballoons forming a strong bond with them and also spews to the external surface of the plasticized and fused vinyl polymer.

EXAMPLE 2B

A composition that will foam on heating is formed from the following:

| | Parts by weight |
|---|---|
| Plastisol of Example 2 | 100 |
| Celogen [1] | 20 |

[1] p,p'-Oxybis(benzenesulfonyl hydrazine).

When applied in a crevice, as between two metal parts, and then heated 30 minutes at 350° F., the plastisol foams and fills the crevice, and the Catalin 8941 is spewed to the surface and forms an adhesive bond with it.

EXAMPLE 3

This example illustrates the use of various different types of phenolics in a plastisol base having the following composition:

Base plastisol

| | Parts by weight |
|---|---|
| Exon 654 | 850 |
| Admex 710 | 425 |
| Di-2-ethylhexyl phthalate | 360 |
| Mark M | 17 |
| DER 331 | 17 |
| Hycar 1312 | 127 |
| | 1796 |

Thirty grams of each of the following phenolics is separately added to 100 parts of the base plastisol:

(1) Varcuum 3030 (2-step thermosetting phenolic with hexamethylenetetramine.

(2) Catalin 8941 (Cashew-nut novolak type phenolic).

(3) Catalin 8855 (2-step cresylic with hexamethylenetetramine).

After applying to a metal surface or between two metal surfaces to form a foam laminate, bake on either of the following schedules:

30 minutes at 350° F.
10 minutes at 400° F.

What we claim is:

1. The process of dissolving resinous vinyl chloride polymer in an ester plasticizer, the plasticizer having dissolved therein an epoxy resin adhesive which is curable at a higher temperature at which the polymer is soluble in the plasticizer, the cured adhesive being substantially insoluble in the plasticizer, which process comprises heating the plastisol with the adhesive distributed in the plasticizer hereof to said higher temperature which is above the temperature of solution of the polymer in the plasticizer and thereby (1) dissolving the plastisol resin in the plasticizer and (2) curing the adhesive and separating at least some of it to the surface of the resulting plasticized resin composition.

2. The process of claim 1 in which small set phenolic bubbles are dispersed in the plasticizer together with the adhesive and polymer prior to heating, and on heating at least some of the adhesive separates on to the bubbles.

References Cited

UNITED STATES PATENTS

| 2,458,739 | 1/1949 | Groten et al. | 260—845 |
| 2,476,832 | 7/1949 | Donia | 260—845 |
| 2,659,708 | 11/1953 | Berger et al. | 260—845 |
| 2,872,366 | 2/1959 | Kierman et al. | 260—845 |
| 2,965,586 | 12/1960 | Fisch et al | 260—837 |
| 3,183,117 | 5/1965 | Yuska et al. | 260—837 |
| 2,614,094 | 10/1952 | Wheelock | 260—837 |
| 2,806,509 | 9/1957 | Bozzacco et al. | 260—2.5 |
| 2,885,303 | 5/1959 | Kaplan | 260—2.5 |
| 3,043,045 | 7/1962 | Martuch | 260—2.5 |
| 3,062,682 | 11/1962 | Morgan et al. | 260—2.5 |
| 3,082,486 | 3/1963 | Khawan et al. | 264—45 |
| 3,112,163 | 3/1963 | Alderfer | 264—45 |
| 3,011,909 | 12/1961 | Hart et al. | 117—72 |
| 3,111,420 | 11/1963 | Boening et al. | 117—72 |
| 2,017,344 | 10/1935 | Ellis | 161—161 |
| 2,642,371 | 6/1953 | Fahrni | 161—161 |
| 2,801,982 | 8/1957 | Fuchs | 260—29.1 |
| 2,814,601 | 11/1957 | Currie et al. | 260—29.1 |
| 2,737,503 | 3/1956 | Sprague et al. | 260—2.5 |
| 2,757,147 | 7/1956 | Pooley | 260—2.5 |

FOREIGN PATENTS 817,981  8/1959  Great Britain.

MURRAY TILLMAN, *Primary Examiner.*

J. A. SEIDLECK, LEON J. BERCOVITZ, *Examiners.*

M. FOELAK, *Assistant Examiner.*

UNITED STATES PATENT OFFICE
CERTIFICATE OF CORRECTION

Patent No. 3,383,337                                           May 14, 1968

Richard A. Garling et al.

It is certified that error appears in the above identified patent and that said Letters Patent are hereby corrected as shown below:

Column 1, line 34, "ot" should read -- to --; line 41, before "plastisol" insert -- plasticized --. Column 2, line 52, "p", second occurrence, should read -- p' --. Column 3, line 36, "by" should read -- but --. Column 4, between lines 30 and 35 in footnote #2, "cadimum" should read -- cadmium --. Column 6, line 5, "hereof" should read -- thereof --.

Signed and sealed this 7th day of October 1969.

(SEAL)
Attest:

Edward M. Fletcher, Jr.                               WILLIAM E. SCHUYLER, JR.
Attesting Officer                                          Commissioner of Patents